Figure 1:
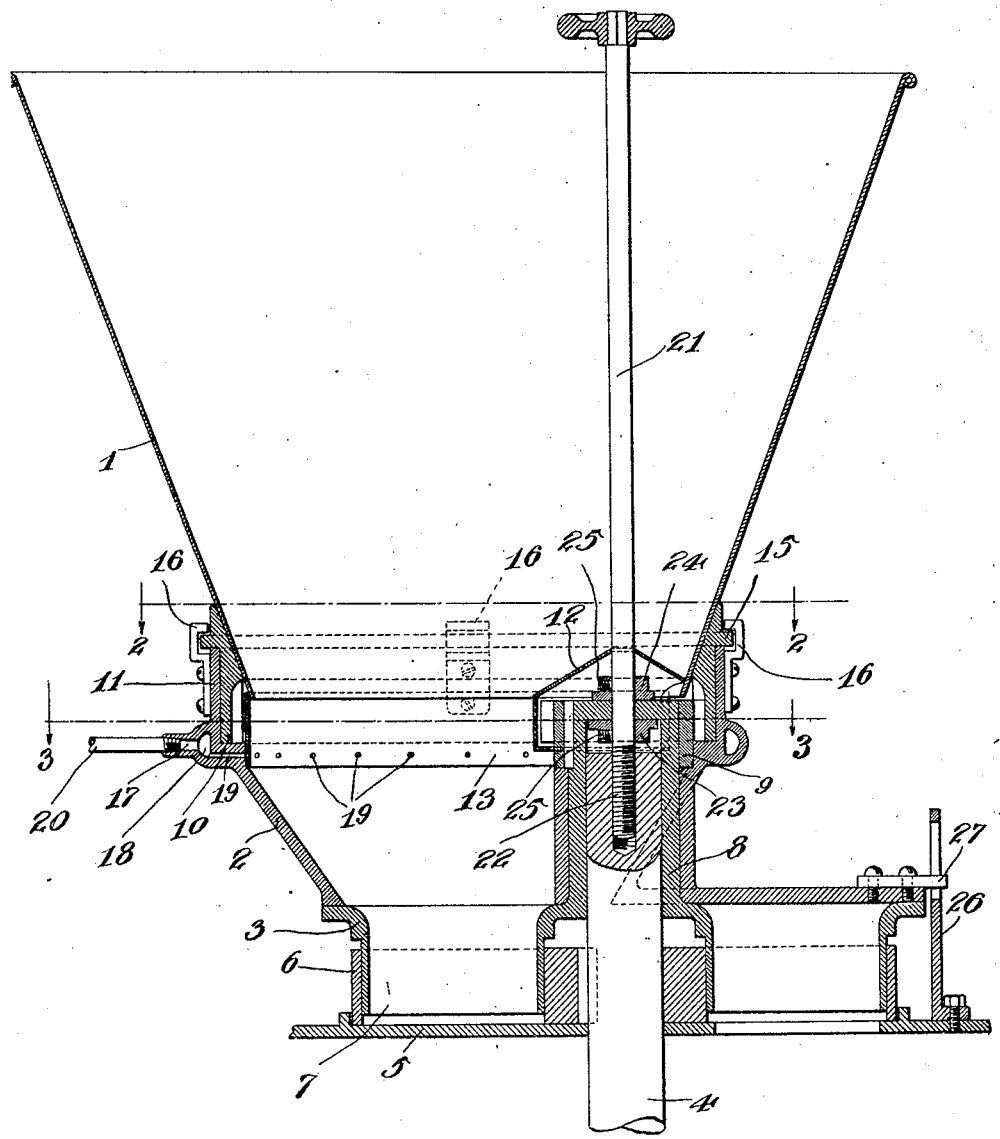

May 12, 1925.　　　　C. H. AYARS　　　　1,537,448
CANNING MACHINERY
Filed Jan. 23, 1924　　　　2 Sheets-Sheet 1

Witnesses:
Virgil L. Mares
George A. Gruss

Inventor
Charles H. Ayars
By Joshua R. H. Potts
his Attorney

May 12, 1925.                                                           1,537,448
                           C. H. AYARS
                        CANNING MACHINERY
                      Filed Jan. 23, 1924          2 Sheets-Sheet 2
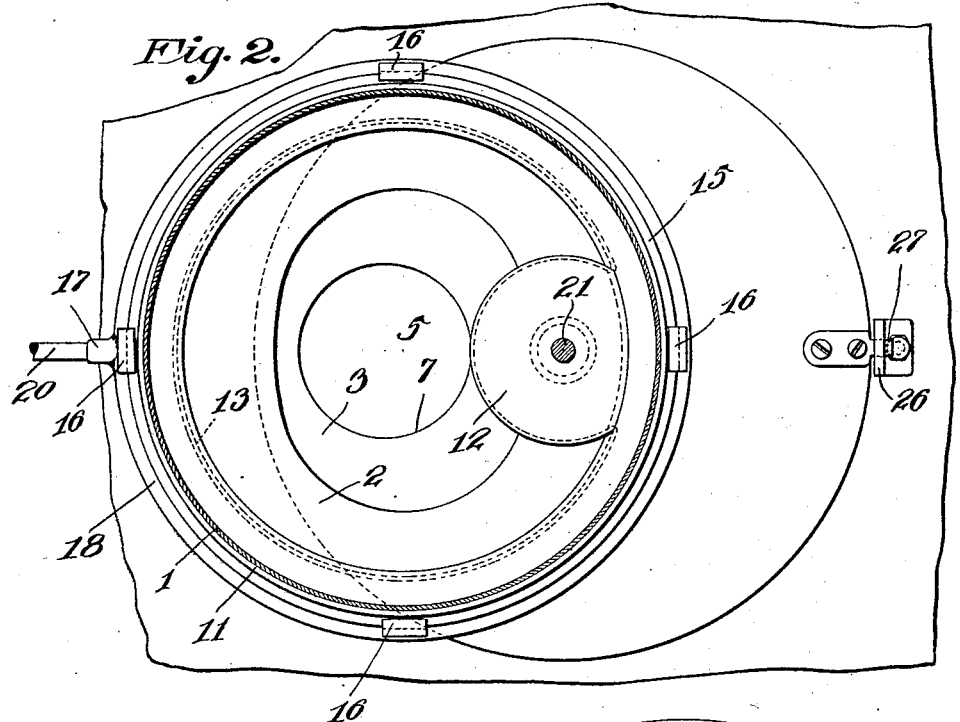
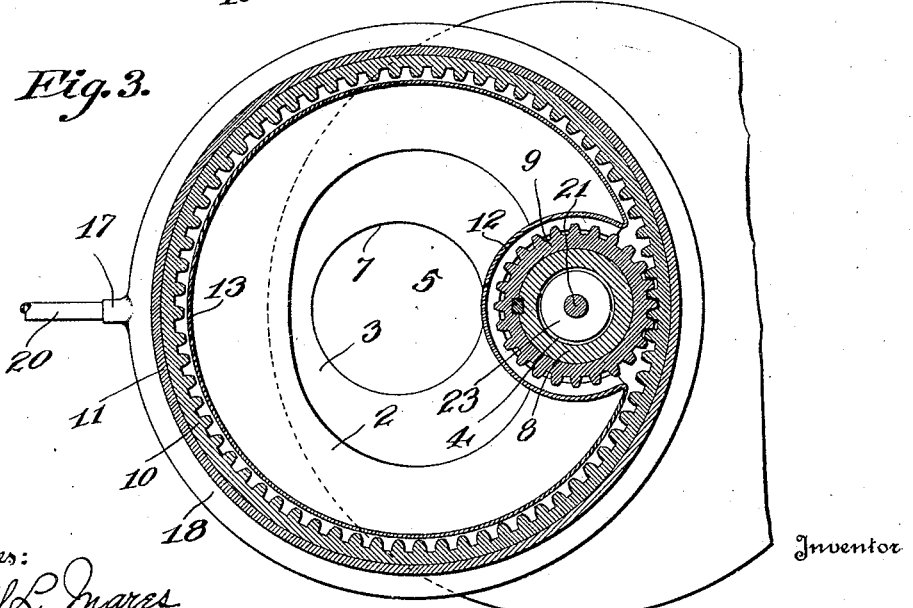

Patented May 12, 1925.

1,537,448

UNITED STATES PATENT OFFICE.

CHARLES H. AYARS, OF SALEM, NEW JERSEY, ASSIGNOR TO AYARS MACHINE COMPANY, OF SALEM, NEW JERSEY.

CANNING MACHINERY.

Application filed January 23, 1924. Serial No. 687,923.

*To all whom it may concern:*

Be it known that I, CHARLES H. AYARS, a citizen of the United States, residing at Salem, in the county of Salem and State of New Jersey, have invented certain new and useful Improvements in Canning Machinery, of which the following is a specification.

One of the ever present problems in the canning industry is provision of adequate means for insuring complete discharge of the granular material. The tendency of viscous granular material to adhere to the hopper presents an ever present problem in the canning art and many attempts have been made to solve this problem. I have discovered that by imparting a continuous axial rotation to the hopper so that the material is fed against a constantly moving inclined surface which induces a downwardly directed spiral movement of the material, the tendency to adhesion is effectively overcome. One object of my invention is to provide simple and efficient means for imparting such continuous rotation and securing such spiral movement of the material.

If the rotating hopper feeds the material into a stationary hopper or funnel which delivers it to the cans, it is practically essential that means be provided for guarding against adhesion of the material to the walls of the stationary hoppers, and another object of my invention is to provide such means.

If the rotating hopper is to function properly with adjustable measuring units it is essential that the hopper and one part of the measuring units be adjustable relatively to the other part, and it is another object of my invention to provide for such adjustment.

These objects and other advantageous ends, which will be described hereinafter, I attain in the following manner, reference being had to the accompanying drawings in which—

Figure 1 is a central vertical section through the hopper and turret of a canning machine, Figure 2 a horizontal section on line 2—2 of Figure 1, and Figure 3 a horizontal section on line 3—3 of Figure 1.

The numeral 1 indicates the hopper, 2 the stationary hopper or funnel leading from the hopper to the measuring units, 3 the measuring wheel, 4 a vertical shaft which supports the hopper and measuring wheel and imparts rotation thereto and 5 the bed plate upon which the measuring wheel rotates. The measuring wheel consists of two telescoping parts 6 and 7. In the form shown, part 6 is splined to the shaft and rests upon the bed plate and part 7 extends upwardly forming a boss 8 embracing the upper end of the shaft and carrying a gear wheel 9 which meshes with an internal gear 10 fixed to the hopper and rotatable in a bearing 11 carried by a part of the frame which is fixed against rotation. A hood 12 covers gear wheel 9 and merges into a band 13 fixed to a part of the frame which is also fixed against rotation. The band embraces the lower edge of the hopper, extends within gear 10 and guards it against access of the material fed through the hopper. Gear 10 is provided with an external annular shoulder 15 which is embraced by clamps 16 detachably connected with bearing 11, or some part of the frame fixed against rotation, and serving to hold the hopper and gear 11 against unintentional upward displacement.

In order to provide against adhesion of the material to the walls of the stationary hopper 2, through which the material passes from the hopper to the measuring units, I provide a liquid inlet 17 communicating with an annular channel 18 provided with perforations 19 and preferably fed by a flexible tube 20. By this means the walls of the chute are continuously lubricated and danger of the adhesion is avoided.

In order to enable the hopper rotating mechanism to function in connection with adjustable measuring units, I provide a rod 21 extending within the hopper, taking through boss 8 and having at its lower end a threaded part 22 taking into a bore in shaft 4. Collars 23 and 24, one above and the other within the boss, are detachably secured to the rod by set-screws 25 or otherwise. The entire structure, except the shaft and part 6 of the measuring units, is free to move vertically relatively to the shaft as indicated by standard 26 and lug 27 slidable thereon. By rotating rod 21 the structure, including part 7 of the measuring units, may be raised or lowered thereby increasing or decreasing the capacity of the measuring units.

It is obvious that rotation of shaft 4 will impart rotation to the hopper and to the measuring wheel.

In use I find that the granular material, instead of maintaining a high level in part of the hopper and feeding from the other part as is usual, maintains a level upper surface and feeds uniformly without adhering to the wall. The rod 21, being stationary and in the path of travel of the material serves as a stirrer and neutralizes any tendency of the material to cohere in objectionable masses.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In a can filling machine, a feed hopper; a gear carried thereby; a power driven shaft; a measuring unit secured to the shaft and rotatable therewith, the measuring unit consisting of telescoping parts adapted to receive material from the hopper, and a gear carried by one of the telescoping parts and meshing with the gear on the hopper.

2. In a can filling machine, a feed hopper; a gear carried thereby; a power driven shaft; a measuring unit secured to the shaft and rotatable therewith, the measuring unit consisting of telescoping parts adapted to receive material from the hopper; a gear carried by one of the telescoping parts and meshing with the gear on the hopper, and means for raising or lowering the hopper and one of the telescoping parts.

3. In a can filling machine, a feed hopper mounted for axial rotation; a rotatable measuring unit having telescoping parts; a stationary hopper arranged to receive material from the rotatable hopper and deliver it to the measuring unit; means for rotating the hopper and measuring unit, and means for raising or lowering the rotatable hopper, the stationary hopper and one of the telescoping parts relatively to the other telescoping part.

4. The combination in a can filling machine of a hopper; a gear carried thereby; a power driven shaft; a gear carried by the shaft meshing with the gear on the hopper, and a stationary rod extending through and supporting the hopper and threaded into the shaft whereby the hopper may be raised or lowered relatively to the bed.

5. In a can filling machine, a rotatable hopper; a rotatable measuring unit having telescoping parts and arranged to receive material from the hopper; a power driven shaft; a gear carried thereby; a gear carried by the hopper meshing with the gear carried by the shaft, and a rod extending through the hopper and threaded into the shaft whereby the hopper and one of the telescoping parts may be raised or lowered relatively to the bed.

6. In a can filling machine, a rotatable hopper; a rotatable measuring unit having telescoping parts; a stationary hopper arranged to receive material from the rotatable hopper and deliver it to the measuring unit; a power driven shaft; a gear carried thereby; a gear carried by the rotatable hopper meshing with the gear carried by the shaft, and a rod extending through the rotatable hopper and threaded into the shaft whereby the rotatable hopper, the stationary hopper and one of the telescoping parts may be raised or lowered relatively to the bed.

7. In a can filling machine, a rotatable hopper; a rotatable measuring unit having telescoping parts; a stationary hopper arranged to receive material from the rotatable hopper and deliver it to the measuring unit; a power driven shaft; a gear carried thereby; a gear carried by the rotatable hopper meshing with the gear carried by the shaft, and a rod extending through the rotatable hopper threaded into the shaft and carrying one of the telescoping parts whereby the rotatable hopper, the stationary hopper and one of the telescoping parts may be raised or lowered relatively to the bed.

8. The combination in a can filling machine of a hopper mounted for axial rotation and carrying a gear; a power driven shaft; a gear carried by the shaft meshing with the gear on the hopper; a rotatable measuring wheel carrying a plurality of measuring units; a stationary hopper adapted to direct material from the rotatable hopper into the measuring units, and means for supplying liquid to the inner wall of the stationary hopper.

9. The combination in a can filling machine of a hopper mounted for axial rotation and carrying a gear; a power driven shaft; a gear carried by the shaft and meshing with the gear on the rotatable hopper; a rotatable measuring wheel carrying a plurality of measuring units; a stationary hopper adapted to direct material from the rotatable hopper into the measuring units; an annular channel, surrounding the stationary hopper, provided with perforations opening thereinto, and a liquid inlet communicating with the channel.

10. The combination in a can filling machine of a hopper mounted for rotation and carrying a gear; a power driven shaft; a measuring unit having telescoping parts and arranged to receive material from the hopper; a boss, carrying one of the telescoping parts, embracing the shaft and carrying a gear meshing with the gear on the rotatable hopper; a rod taking through the boss and having a threaded connection with the shaft, and means for securing the boss to the rod.

11. The combination in a can filling machine of a hopper mounted for rotation and carrying a gear; a power driven shaft; a measuring unit secured to the shaft and rotating therewith having telescoping parts; and a stationary hopper arranged to receive material from the rotatable hopper and deliver it to the measuring units.

12. In a can filling machine, a hopper mounted for axial rotation and carrying an internal gear; a power driven shaft; a gear carried by the shaft meshing with the gear on the hopper; a rod extending through and supporting the hopper whereby the hopper may be raised or lowered relatively to the shaft, and means protecting the gearing against access of the material being fed.

In testimony whereof I have signed my name to this specification in the presence of two subscribing witnesses.

CHARLES H. AYARS.

Witnesses:
GEORGE B. PARKINSON,
CHAS. E. POTTS.